Patented June 13, 1939

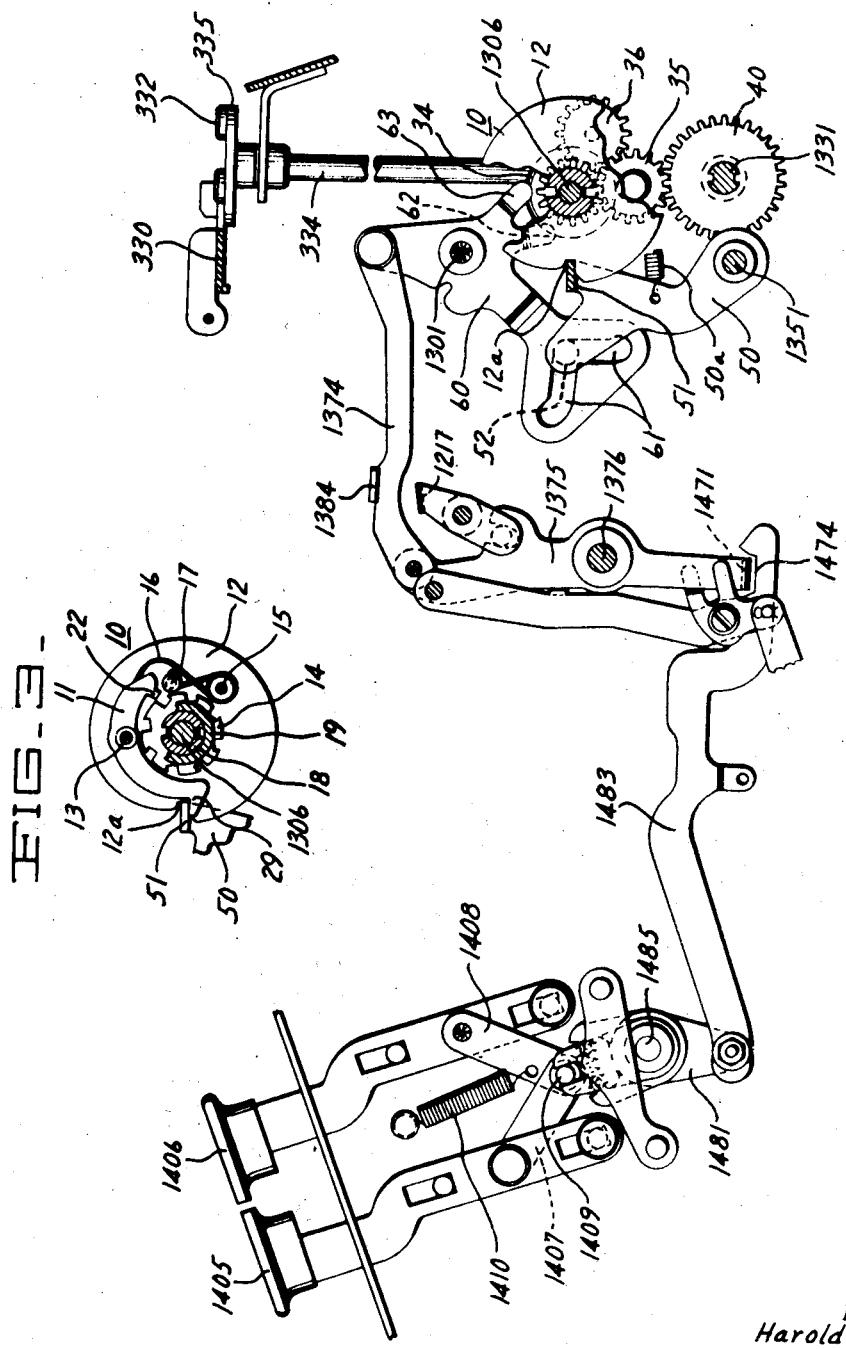

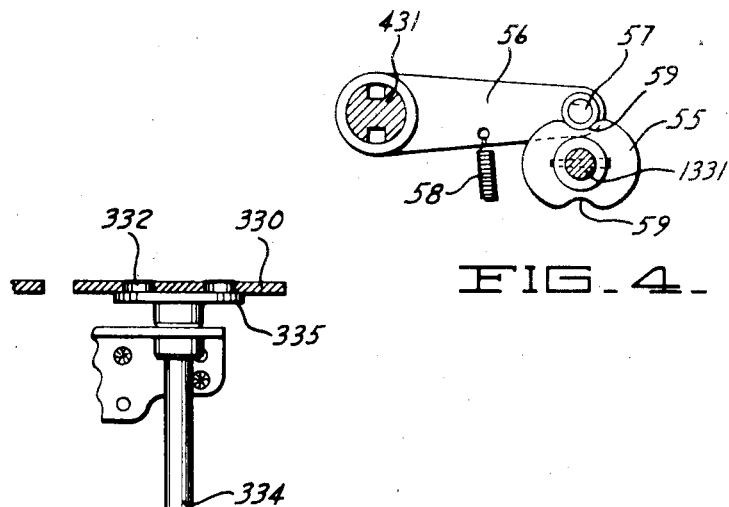
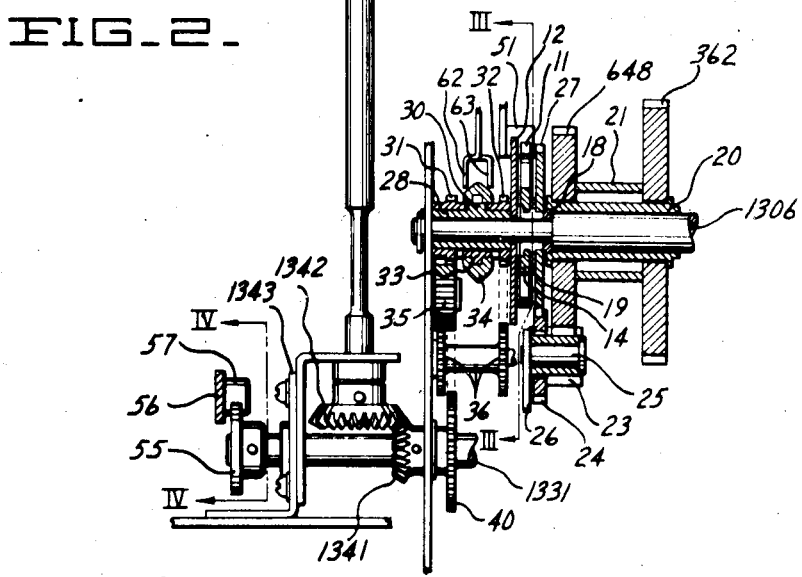

2,162,238

UNITED STATES PATENT OFFICE 2,162,238

CLUTCH AND POWER TRANSMISSION

Harold T. Avery, Oakland, and Howard M. Dustin, Berkeley, Calif., assignors to Marchant Calculating Machine Company, a corporation of California Application October 4, 1938, Serial No. 233,254

11 Claims. (Cl. 192—3.5)

The present invention relates to a clutch and power transmission particularly adapted for use in calculating machines. The improvements are shown as embodied in the commercially known Marchant calculating machine disclosed in the Avery patent application Serial Number 84,927, filed June twelfth, 1936.

The combined clutch and reversible transmission disclosed in the aforesaid patent application, in connection with the carriage shifting mechanism, depends upon a spring urged centralizer to complete the carriage shift cycle, and does not provide positive centralization. Furthermore, it is necessary to make the centralizing spring of such strength as to carry the driven mechanism ahead of the driving means in order to allow the clutch to disengage before the end of the cycle. This causes an uneven and jerky carriage movement which is undesirable in a modern high speed calculating machine.

Having in mind the foregoing deficiencies of the clutching and power transmission devices heretofore employed, it is an object of the present invention to provide means whereby the driven member of such a mechanism may be operated selectively in either direction and positively centralized in a definite full cycle position.

A further object of the invention is to provide a control device for such mechanism which may be operated merely by displacement in one direction or another from normal position to cause selective operation of the driven member in one direction or the other.

A further and more specific object of the invention is to provide an improved clutch and power transmission which is adapted for cooperation with the existing manual and automatic control devices of calculating machines of the class referred to.

Other objects will appear during the following detailed description of a preferred form of the invention, reference being made to the accompanying drawings forming a part of this specification, in which—

Figure 1 is a right side view, partly in section, of the control keys and the control connections thereof with the power transmission mechanism;

Figure 2 is a front view, partly schematic and partly in section, showing the construction of the clutch and reversing mechanism from the drive train to the carriage of a calculating machine;

Figure 3 is a detailed section of the clutch taken on the line 3—3 of Figure 2;

Figure 4 is a detailed section of the means for centralizing the carriage when disconnected from the clutch, the section being taken on the line 4—4 of Figure 2;

Figure 5 is an enlarged fragmentary view of part of Figure 2, for more clearly showing the reversing mechanism.

The machine disclosed in the aforesaid patent application is provided with a motor (not shown), which constitutes the driving means for the clutch 10 (Figure 1). The power is transmitted from the motor through suitable gears and shafts to gear 362 (Figure 2). This gear and a second gear 648 are keyed to a sleeve 20 and positioned by a spacer 21, the sleeve 20 being upset on each end to form an integral unit which is freely rotatable on a fixed support shaft 1306. Gear 648 is connected to the driving side of the clutch 10 through compound idlers 23 and 24, which are supported by a stud 25 secured to a stationary brace plate 26, and a drive gear 27 keyed to a sleeve 18, rotatably mounted on the shaft 1306. A ratchet 14 (Figures 2 and 3) is also keyed to sleeve 18, and is separated from gear 27 by a spacer 19, the sleeve 18 being upset to form a second integral unit which is freely rotatable on a reduced portion of shaft 1306.

Adjacent ratchet 14 is the driven side of the clutch, comprising a third integral unit consisting of a clutch disc 12 (Figure 3) secured to a sleeve 28 (Figure 2) also rotatable on the reduced portion of shaft 1306. The clutch disc 12 has secured thereto a stud 13 (Figure 3) on which is rockably mounted a clutch dog 11, adapted to engage in a notch of the ratchet 14. A torsion spring 16 is mounted on a second stud 15 in disc 12, and is retained at one end by a third such stud 17, the other end pressing against the side of the dog 11, to urge said dog in a clockwise direction; stud 17 also serving to limit the dog in its clockwise rocking movement.

The dog 11 is normally held out of engagement with ratchet 14 by a clutch control dog 50, pivotally supported on shaft 1351, and provided with an ear 51 adapted to enter a notch 12a of clutch disc 12, to engage the tip 29 of clutch dog 11 and rock the latter counter-clockwise out of engagement with ratchet 14 when said clutch control dog 50 is in clutch disengaging position. The notch 12a is preferably formed with sufficiently steep walls to prevent retrograde movement of disc 12 when the control dog 50 is seated, thus preventing rasping of the clutch and also centralizing the driven side thereof in a definite full cycle position.

The reversing mechanism comprises sleeve 28

(Figure 5) which is provided with an annular flange 30, on either side of which are mounted gears 31 and 32, freely rotatable on the said sleeve 28. The annular flange 30 and each gear 31 and 32 are slotted to receive a slidable key 33, a lug 33a of which is embraced by a shiftable annular collar 34, so that if said collar is moved to the right or left in a manner to be described hereinafter, the key 33 will disconnect one gear 31 or 32 from the sleeve 28 and connect the other gear thereto. If the collar 34 is moved to the left, the key 33 effects a drive directly from gear 31 through gear 35 to gear 40, but if said collar is shifted to the right a drive is effected from gear 32 through the reverse idler 36 to gears 35 and 40, thereby driving the gear 40 in the reverse direction.

The direction of rotation of shaft 1331 upon which gear 40 is fixed determines the direction of the carriage shift in a calculating machine of the type referred to. On said shaft is mounted a bevel gear 1341 which meshes with a second bevel gear 1342 secured to the lower end of a vertical shaft 334, journaled at each end in bearings provided in suitable brackets. Secured at the upper end of said shaft is a disc 335 on which are mounted rollers 332, so that when shaft 1331 is rotated in either direction the rollers 332 successively engage between the teeth of a rack 330 to move the carriage of a calculating machine in one direction or the other as described in the Avery patent application above identified.

The controls for the clutch and reversing mechanism are operable by the keys 1405 and 1406 (Figure 1), and means are provided whereby the depression of one or the other of said keys will effect the engagement of the clutch and shift the collar 34 (Figure 5) to one extreme position or the other, thereby determining the direction of operation of the driven mechanism.

As explained in detail in the aforesaid Avery patent application, upon depression of the key 1405 the shaft 1485 is rocked clockwise, and upon depression of the key 1406 said shaft is rocked counter-clockwise. The rocking of this shaft is utilized to control the above described mechanism.

Mounted upon shaft 1485 is a lever 1481 pivotally connected to a link 1483, provided with a notch 1474, which embraces a lateral extension 1471 of lever 1375 pivoted at 1376. A link 1374 is attached at its left end to the upper end of lever 1375 and at its right end to a clutch control member 60, pivoted at 1301, so that control member 60 is rocked clockwise when key 1405 is depressed and counter-clockwise when key 1406 is depressed. The lateral extensions 1217 and 1384 serve to automatically rock control member 60 during certain automatic operations in a manner similar to that described in said Avery application.

The control member 60 (Figure 1) is provided with a V-shaped aperture 61 which embraces a stud 52 on clutch control dog 50, so that when the member 60 is rocked in either direction the control dog 50 is rocked counter-clockwise about shaft 1351 to clutch engaging position, whereupon lateral extension 51 (Figures 1 and 3) releases clutch dog 11 so it may be rocked clockwise into engagement with ratchet 14 by spring 16 to effect a drive through the clutch 10 to the driven train.

Member 60 is also provided with two fingers 62 and 63 (Figures 1 and 2), the finger 62 being disposed on the left side of collar 34, and finger 63 on the right side thereof (as viewed in Figure 2), so that when the member 60 is rocked counter-clockwise as by key 1406, the collar 34 is shifted to the right to effect leftward carriage movement through gears 32, 36, 35, and 40. If the member 60 is rocked clockwise, as by key 1405, the finger 63 shifts the collar to the left to effect a rightward carriage movement through gears 31, 35, and 40.

From the foregoing it will be readily seen that while lateral extension 51 (Figure 1) is being rocked counter-clockwise, the collar 34 is concurrently conditioned for directional control of the drive effected by the unidirectional clutch 10. When the clutch is ultimately engaged, the lateral extension 51 rides on the periphery of the disc 12 and retains control member 60 in its selected position until the cycle is completed. As the disc 12 approaches a full cycle position (the depressed key 1405 or 1406 having been released) the lateral extension 51 engages the tip 29 and rocks the clutch dog 11 counter-clockwise to disengage the clutch, at the same time the control dog 50 is rocked clockwise by spring 50a to carry said lateral extension into the notch in disc 12 to lock the same in full cycle position.

Preferably the fingers 62 and 63 are so spaced from the collar 34 as to cause the return of the control lever 60 to the intermediate position shown in Figure 1 to move the collar 34 approximately to central position. The distance which the collar will be so moved is obviously dependent upon the angular relation of fingers 62 and 63 however, and if they are arranged at a more obtuse angle the collar will remain at the previous setting until the transmission is reversed when the opposite finger will shift the collar 34 and key 33 to the other extreme position before the clutch is reengaged.

In order to insure that the notch of the gear 40 not engaged by key 33 will be aligned therewith at the conclusion of each cycle so that the key may be shifted freely, it is desirable to provide means for centralizing the driven elements of the reversing clutch in a definite full cycle position. For this purpose the shaft 1331 extends through the bracket 1343 and has secured thereto a cam 55 (Figures 2 and 4). A cam follower 56 is freely pivoted on shaft 431 and is provided with a roller 57 which lies in the plane of the cam 55, so that when shaft 1331 and said cam reach a centralized position, in one of which positions it is shown in Figure 4, the spring 58 urges the roller 57 into one of the recesses 59 of the cam 55 and retains the entire train in a centralized position.

We claim:

1. In a cyclic transmission, comprising a cyclic clutch with driving and driven elements, in combination with independent reversing mechanism; control means operable to concurrently engage said clutch and adjust the reversing mechanism, and a member controlled by said clutch for conjointly preventing disengagement of said clutch and for retaining said reversing mechanism in said adjusted position for the duration of a complete cycle of operation of said clutch.

2. In a cyclic transmission, comprising a clutch with driving and driven elements, in combination with independent reversing mechanism; a control member selectively displaceable from a normal ineffective position to either of two positions, and means controlled thereby upon movement thereof to either of said two positions for engaging said clutch and adjusting said reversing mechanism.

3. In a cyclic transmission, comprising a unidirectional cyclic clutch, in combination with independent reversing mechanism; control mechanism displaceable to concurrently effect engagement of said clutch and to adjust the reversing mechanism, and means for retaining said control mechanism and said reversing mechanism in adjusted position, including a member controlled by said clutch for preventing release of said retaining means except after conclusion of one or more complete cycles of operation of said clutch.

4. In a transmission comprising a clutch with driving and driven elements in combination with reversing mechanism including a pair of gears and an element rotatable by the driven element of said clutch and selectively shiftable to connect one or the other of said gears to said driven element; control means operable to concurrently engage said clutch and shift said element selectively, and a member controlled by said clutch for preventing disengagement of said clutch and retaining said element in shifted position for the duration of a complete cycle of operation of said clutch.

5. In a transmission comprising a clutch with driving and driven elements in combination with reversing mechanism including a pair of gears and an element rotatable by the driven element of said clutch and selectively shiftable to connect one or the other of said gears to said driven element; a control member selectively displaceable from a normal ineffective position to either of two positions, and means controlled thereby upon movement thereof to either of said two positions for concurrently engaging said clutch and shifting said element to connect one or the other of said gears to the driven element of the clutch, and a device controlled by said clutch for preventing disengagement of said clutch and retaining said element in shifted position for the duration of a complete cycle of operation of said clutch.

6. In a transmission comprising a clutch with driving and driven elements in combination with reversing mechanism including a pair of gears and an element rotatable by the driven element of said clutch and selectively shiftable to connect one or the other of said gears to said driven element; a control member selectively displaceable from a normal ineffective position to either of two positions, and means controlled thereby upon movement thereof to either of said two positions for concurrently engaging said clutch and shifting said element to connect one or the other of said gears to the driven element of the clutch, and means for retaining said control member, and said element in shifted position, including a device controlled by said clutch for preventing release of said retaining means except after conclusion of one or more complete cycles of operation of said clutch.

7. In a cyclic transmission comprising a clutch with driving and driven elements, in combination with independent reversing mechanism; a control member selectively displaceable from a normal ineffective position to either of two operative positions, means controlled thereby upon movement thereof to either of said two operative positions for concurrently engaging said clutch and adjusting said reversing mechanism, a clutch control dog normally spring urged to clutch disengaging position but controlled by said clutch upon rotation thereof, and means controlled by said clutch for retaining said dog in clutch engaging position and said reversing mechanism in said adjusted position for the duration of a complete cycle of operation of said clutch.

8. In a transmission comprising a clutch with driving and driven elements in combination with reversing mechanism including a pair of gears and a device rotatable by the driven element of said clutch and selectively shiftable to connect one or the other of said gears to said driven element of the clutch; a clutch control dog mounted for pivotal movement to clutch engaging or disengaging positions, a control member selectively displaceable from a normally ineffective position to either of two operative positions to concurrently rock said dog to clutch engaging position and shift said device to connect one or the other of said gears to the driven element of the clutch.

9. In a cyclic transmission comprising a clutch with driving and driven elements, in combination with independent reversing mechanism; a control member selectively displaceable from a normally ineffective position to either of two operating positions, means controlled thereby upon movement thereof to either of said two operative positions for concurrently engaging said clutch and adjusting said reversing mechanism, and a clutch control dog normally spring urged to clutch disengaging position but controlled by said clutch upon rotation thereof to become ineffective to disengage said clutch and to retain said reversing mechanism in adjusted position for the duration of a complete cycle of operation of said clutch.

10. In a cyclic transmission comprising a unidirectional clutch, in combination with independent reversing mechanism; control mechanism displaceable to concurrently effect engagement of said clutch and to adjust the reversing mechanism, means for retaining said control mechanism in displaced position, and a clutch control dog controlled by said clutch upon rotation thereof for preventing release of said retaining means except at the conclusion of one or more complete cycles of operation of said clutch.

11. In a cyclic transmission comprising a cyclic clutch with driving and driven elements, in combination with independent reversing mechanism, and a clutch control dog mounted for pivotal movement to clutch engaging or disengaging positions; a control member selectively displaceable from a normally ineffective position to either of two operative positions, means controlled by movement thereof to either of said two operative positions for concurrently rocking said dog to clutch engaging position and adjusting the reversing mechanism, and an element rotatable with said clutch and rendered effective by movement thereof out of full cycle position for locking said dog in clutch engaging position, said control member in operative position and said reversing mechanism in adjusted position until the conclusion of one or more complete cycles of operation of said clutch.

HAROLD T. AVERY.
HOWARD M. DUSTIN.